(12) United States Patent
Mueller-Diveky

(10) Patent No.: US 10,783,838 B2
(45) Date of Patent: Sep. 22, 2020

(54) DISPLAY DEVICE FOR A SEAT IDENTIFIER, AND VEHICLE

(71) Applicant: DIEHL AEROSPACE GMBH, Ueberlingen (DE)

(72) Inventor: Stefan Mueller-Diveky, Schoeneck (DE)

(73) Assignee: DIEHL AEROSPACE GMBH, Ueberlingen (DE)

( * ) Notice: Subject to any disclaimer, the term of this patent is extended or adjusted under 35 U.S.C. 154(b) by 80 days.

(21) Appl. No.: 16/121,784

(22) Filed: Sep. 5, 2018

(65) Prior Publication Data

US 2019/0080655 A1   Mar. 14, 2019

(30) Foreign Application Priority Data

Sep. 8, 2017 (DE) .................. 10 2017 008 465

(51) Int. Cl.
*G09G 3/34* (2006.01)
*B60N 2/02* (2006.01)
(Continued)

(52) U.S. Cl.
CPC ............ *G09G 3/3433* (2013.01); *B60N 2/02* (2013.01); *B60N 2/90* (2018.02); *B60R 5/00* (2013.01);
(Continued)

(58) Field of Classification Search
CPC ........... G09G 3/3433; G09G 2300/026; G09G 2370/022; G09G 2340/0478; G09F 9/30; B64D 2045/007; B64D 11/00; B64D 45/00; B64D 11/003; B64D 11/06; B60N 2/02; B60N 2/90; B63B 2029/043; B63B 29/04; B60R 2011/0036; B60R 2011/0012; B60R 11/0229; B60R 5/00; B65G 69/22;
(Continued)

(56) References Cited

U.S. PATENT DOCUMENTS 8,060,015 B2 * 11/2011 Meckesheimer ....... G09F 9/372
                                                                 455/41.2
2006/0032979 A1   2/2006 Mitchell et al.
(Continued)

FOREIGN PATENT DOCUMENTS

DE           4442512 A1    2/1996
DE     102012000159 A1    7/2013
(Continued)

*Primary Examiner* — Muhammad N Edun
(74) *Attorney, Agent, or Firm* — Scully Scott Murphy and Presser

(57) ABSTRACT

A display device (4) for an identifier (6a,b) of a seat (8a,b) of a vehicle (2) with a variable mounting location (10a,b) contains a display (12) along an extension direction (14), which can be attached to a carrier (16) of the vehicle (2) at the seat (8a,b) in the extension direction (14) along possible mounting locations (10a,b), and a control device (22) for displaying identifiers (6a,b) on the display (12) in different longitudinal positions (Pa,b), which are assigned to mounting locations (10a,b).

A vehicle (2) having such a seat (8a,b) and a carrier (16) contains the display device (4), wherein the display (12) is attached to the carrier (16) in the surroundings (20) of the seat (8a,b) and extends in the extension direction (14) along possible mounting locations (10a,b) of the seat (8a,b).

13 Claims, 3 Drawing Sheets

(51) Int. Cl.
*B60R 5/00* (2006.01)
*G09F 9/30* (2006.01)
*B60N 2/90* (2018.01)
*B64D 11/06* (2006.01)
*B64D 11/00* (2006.01)
*B60R 11/02* (2006.01)
*B61D 41/00* (2006.01)
*B64D 45/00* (2006.01)
*B63B 29/04* (2006.01)
*B60R 11/00* (2006.01)
*B61D 1/04* (2006.01)

(52) U.S. Cl.
CPC .......... *B60R 11/0229* (2013.01); *B61D 41/00* (2013.01); *B64D 11/003* (2013.01); *B64D 11/06* (2013.01); *B64D 45/00* (2013.01); *G09F 9/30* (2013.01); *B60R 2011/0012* (2013.01); *B60R 2011/0036* (2013.01); *B61D 1/04* (2013.01); *B63B 29/04* (2013.01); *B63B 2029/043* (2013.01); *B64D 2045/007* (2013.01); *G09G 2300/026* (2013.01); *G09G 2340/0478* (2013.01); *G09G 2370/022* (2013.01)

(58) Field of Classification Search
CPC .......... B61D 41/04; B61D 41/00; B61D 1/04; B60Q 3/00
See application file for complete search history.

(56) References Cited

U.S. PATENT DOCUMENTS

2011/0226859 A1* 9/2011 Chen ................ G06K 19/07703
235/492
2014/0313751 A1 10/2014 Abel
2015/0145300 A1 5/2015 Finlay et al.
2018/0201280 A1 7/2018 Wolf

FOREIGN PATENT DOCUMENTS

| DE | 102013207062 A1 | 10/2014 |
| DE | 10 2014 209 552 A1 | 11/2015 |
| EP | 2 679 464 A1 | 1/2014 |
| EP | 2 778 065 A2 | 9/2014 |
| WO | WO 2011/082998 A1 | 7/2011 |
| WO | 2017/005495 A1 | 1/2017 |

* cited by examiner

DISPLAY DEVICE FOR A SEAT IDENTIFIER, AND VEHICLE

BACKGROUND OF THE INVENTION

The invention relates to a display device for displaying at least one identifier for a seat in a vehicle, and a vehicle having a corresponding display device.

DISCUSSION OF THE PRIOR ART

In particular in vehicles having a large number of seats, such as for example in an aircraft, it is known from practice to identify the seats with an identifier, e.g. a seat number. The corresponding identifier is attached in the vicinity of the relevant seat, in the case of aircraft for example above the row of seats in the area of the luggage compartments.

Often, in practice the reconfiguration of corresponding seating, which means a reconfiguration of the seat arrangement, in the vehicle is desired. Accordingly, the identifiers for the corresponding seats then also have to be moved to other positions in order to produce the physical association between identifier and seat once more.

To this end, it is known from practice to re-position appropriately printed or engraved stickers or signs mechanically or objectively.

SUMMARY OF THE INVENTION

The present invention is directed to a display device for displaying at least one identifier for a seat in a vehicle, a mounting location of the seat in the vehicle being variable.

More particularly, the display device in accordance with the present invention contains an electronic display. The display extends along an extension direction. The display can be attached to a carrier of the vehicle in the surroundings of the seat. It can be attached in such a way that it extends in its extension direction along possible mounting locations of corresponding seats.

The display device also contains a control device. This is used to display the identifier on the display optionally in at least two different longitudinal positions of the display along the extension direction of the display. The respective longitudinal position is assigned to the respective mounting location of the seat. "Optionally" means that at any time the identifier can therefore be displayed at a specific single location of the display, it being possible to choose between at least two locations.

The corresponding seats can therefore be mounted and fixed at various mounting locations in the vehicle, in particular shifted or displaced between these. The display is a display strip, that is to say a strip-like or stripe-like display extending in the longitudinal direction of the vehicle. In other words, the carrier is a supporting structure or any other type of constituent part of the vehicle which is suitable for a mounting for a display. The longitudinal positions are therefore various locations of the display along its extension direction. The identifier is, for example, a number and/or letter combination of a seat or a row of seats. The identifier here can also contain additional information, for example relating to the reservation of a seat, a name of a person reserving the seat or other information. In particular, other information can also be displayed on the display in regions not used by identifiers, e.g. smoking ban, free/occupied displays of washrooms and so on.

In their entirety, the seats of a vehicle therefore form seating, for example of an aircraft cabin. The control device is also used in particular for the basic or general activation of the display, for example also for its energy supply, switching on/off, brightness control and so on.

By virtue of the invention, it is possible, in the event of a change to the mounting locations of seats, to displace the corresponding identifier on or within the display without having to change the display physically. The change of the display location of the identifier on the display can therefore be carried out purely electronically with the aid of activation by the control device. A physical intervention in identifiers is no longer necessary. Thus, the identification of seats in the vehicle can be changed particularly simply, uncomplicatedly and rapidly. As a result of the possibility of the electronic changing of the contents of the display, the configuration of identifiers can be configured to be particularly flexible and uncomplicated, for example names of individuals who reserve a corresponding seat can be displayed purely electronically and exchanged.

The display contains a plurality of portions separated from one another, each display portion likewise extending along the extension direction. The individual portions can be lined up in a row along the extension direction. The corresponding portions are individual displays which, taken together, result in the overall display or display or combine to form the latter. The portions can be lined up in a row without gaps or with gaps. If an identifier is displaced from one to a second longitudinal position, this can also be shifted or converted from one portion to another portion. The longitudinal positions for an identifier to be displaced offset can therefore be located in different portions. Thus, a comparatively long overall display of, for example, some umpteen metres length along an aircraft cabin can be assembled simply and economically from portions.

The display is an ePaper display. ePaper or "electronic paper", as is described extensively on the Wikipedia website ("https://de.wikipedia.org/wiki/Elektronisches_Papier"), is sufficiently well known from practice, and will therefore not be explained in more detail here. This results in particular in the advantage that a display once set on the display can also be kept without any further energy supply. Energy supply is needed only to change the display. Thus, an energy-saving possible way of displaying identifiers for seats in vehicles results.

In a preferred exemplary embodiment, the identifier can be displayed along the extension direction in a continuously freely selectable longitudinal position of the display. Here, "continuously" is to be understood in particular to mean that the corresponding identifiers in the case of a pixel display can possibly be displaced or placed only pixel by pixel and/or can each be displayed only at the edge at limits of individual displays but not extending beyond the display. Although this means intrinsically discrete placing, in relation to the conventional dimensional relationships of display and identifier, for example in a vehicle, this is to be understood as (quasi) continuous. Thus, each identifier can be displayed in any desired position on the display, in order to permit the most possible unique identification of associated seats.

In a preferred embodiment, the display device contains a transmission module. This is used for the non-contact transmission of energy and/or data. The transmission takes place between a remote station and the display device (in particular the display and/or control device), in particular from the remote station to the display device. The remote station is in particular a portable RFID device (radio-frequency identification, "reader"), the transmission module then likewise an RFID module. The transmission module contains in particular a coil of a pair of coils, the second, associated coil being part of the remote station. The actual non-contact transmission takes place between the coils, in particular with the aid of electromagnetic fields or induction. Discrete or galvanic connections between the remote station and the display device are thus avoided, which is advantageous in particular when the display or the display device is mounted on a movable part in the vehicle. Thus, no cable connection to the fixed part of the vehicle is necessary, which would then likewise be subjected to movement and thus would be susceptible to faults.

The present invention is also directed to a vehicle containing at least one seat, a mounting location of the seat in the vehicle being variable. The vehicle additionally contains a carrier. The vehicle contains a display device according to the invention. Here, the display of the display device is attached to the carrier of the vehicle in the surroundings of the seat. The display extends in the extension direction along possible mounting locations of the seat.

The vehicle and at least some of its embodiments and the respective advantages have already been explained analogously in conjunction with the display device according to the invention.

In a preferred embodiment, the mounting location is variable along a longitudinal direction of the vehicle. The extension direction of the display is then the longitudinal direction of the vehicle. Comparatively small deviations of the extension direction from the longitudinal direction are included, for example deviations which are predefined by shapes, curvatures, ledges, etc. of the carrier when the display is fixed to the carrier or follows the shape of the carrier. Thus, it is possible to indicate on the display a corresponding identifier in that longitudinal position of the vehicle in which the corresponding seat is also mounted. Thus, particularly intuitive association of identifier and seat is possible.

In a preferred embodiment, the seat is part of a row of seats. A row of seats has at least two, in particular two, three or four, seats. The row of seats can in particular be displaced in its entirety in the longitudinal direction of the vehicle. The row of seats extends in particular transversely with respect to the longitudinal direction of the vehicle, the seats being arranged beside one another. In this case, the identifier is in particular a seat row identifier, possibly supplemented further by individual seat identifiers (numbers, letters, etc.). In particular in aircraft, the indication of a row of seats for seats is particularly common, which can be accomplished by the invention.

In a preferred embodiment, the carrier is a structural part of the vehicle, the structural part being located in the area of a gangway. The gangway is in turn located beside the seat or a corresponding row of seats, if present. The structural part is located either in the area of a corresponding gangway, alternatively or additionally it is visible at least from the relevant gangway. Gangways of this type between or beside seats or rows of seats are common, in particular in vehicles such as coaches, passenger ships or aircraft. Passengers move in the gangway in order to reach their seats. If the carrier is located in the area of the gangway and/or is visible from the latter, the display can also be mounted appropriately on the carrier so as to be easily visible from the gangway. Thus, passengers can see the identifiers well. In particular, the display is therefore attached to the carrier in the area of the gangway and/or so as to be visible from the latter.

In a preferred embodiment, the carrier contains a luggage compartment of the vehicle, which is mounted above the seat. In particular, the carrier is formed exclusively by one or more luggage compartments. A corresponding luggage compartment in the aircraft is, for example, a "hat rack" or "bin". However, the displays can also be mounted in intermediate regions between two luggage compartments and so on as carriers, so that as far as possible all the possible mounting positions for seats are covered by the display. Luggage compartments are intrinsically mounted in such a way that they are easily reachable by passengers. Therefore, displays mounted on the luggage compartments are also easily visible.

In a preferred variant of this embodiment, the display for a respective luggage compartment is implemented so as to be continuous and interruption-free. The freedom from interruption in this case relates at least to the continuously freely selectable (see above) placing of the identifier. At least on one luggage compartment, the display is therefore also implemented in one piece, that is to say also physically interruption-free, so that a visually particularly attractive appearance results and also the corresponding identifier can be placed continuously and without gaps or optionally in the region of the luggage compartment.

In a preferred variant of this embodiment, the display device also includes the aforementioned transmission module, and the vehicle contains the remote station. The luggage compartment has a base permanently installed in the vehicle. The luggage compartment also has a cover part that can be moved relative to the base. The display is attached to the cover part. The transmission module contains a first coupling part, which is attached to the base. The remote station contains a second coupling part, which is attached to the cover part. The first and second coupling part are in particular operatively coupled for non-contact transmission, at least in a specific state of movement, in particular in a closed state, of the cover part.

In particular, a data and/or energy transmission therefore functions at least in the closed state (cover part closed) of the luggage compartment. Movable wiring between base and cover part is therefore not necessary. At least in the closed state of the luggage compartments, which is the usual state during service work or during a change of the seating in the vehicle, reconfiguration of the displays and the corresponding replacing of the identifiers are thus also possible. In alternative embodiments, it is of course possible for the operative connection between the coupling parts also to be produced in other operating states of the luggage compartments or in all the operating states of the luggage compartments. For the corresponding state, in particular one which is normally assumed by a luggage compartment during reconfiguration of the seating of the vehicle is chosen.

In a preferred embodiment, the vehicle is a bus or a train or a boat or an aircraft. The appropriate embodiment also applies on its own to the aforementioned display device. In particular in an aircraft, the aforementioned remote station is a cabin management system (CMS). Such a CMS is usually present in any case in an aircraft and can thus also be used for the reconfiguration of the identifiers on the displays. Additional hardware is therefore not generally necessary in the aircraft in this connection.

In a preferred embodiment, the vehicle contains a central unit for placing all the identifiers on the display. The corresponding central unit is in particular the aforementioned CMS. Thus, from an appropriate central unit, it is also possible for a plurality of display devices or control devices or displays to be activated and configured. In addition, other information on the displays can therefore be displayed or controlled by the central unit.

In a preferred embodiment, the display ends flush with a surface of the carrier. Thus, a particularly attractive visual solution results, in which the display likewise appears integrated seamlessly in the carrier.

The invention is based on the following findings, observations and considerations and also has the following embodiments. The embodiments are to some extent also called "the invention" for simplicity. The embodiments here can also contain parts or combinations of the aforementioned embodiments or correspond to these and/or possibly also include embodiments not mentioned hitherto.

It is known from practice to use locally permanently attached signs or stickers in the region of the hat rack/bin (hand-luggage compartment) in aircraft in order to identify seats.

The invention is based on the idea of using a display for imparting the information. Reconfiguration (adaptation of the placing) of the labelling is therefore possible centrally. In this way, making the cabin configuration more flexible is assisted/made possible. Additional information can be displayed on the display; this assists personalisation of the information. As a result of the properties of an ePaper display, an energy supply is needed only to change the displayed contents.

The invention is based on the consideration that, in particular in an aircraft as vehicle, simple reconfiguration of the cabin, in particular rapid conversion of the seating, is desired. Here, changing the labelling (seat signs) on the gangway is also necessary.

The idea of the invention is to replace the seat designation known from practice implemented by signs/stickers on the bin (luggage compartment) by a solution that can be personalised and placed freely, based on ePaper technology. This is to be implemented in the form of a continuous display strip on the width of a bin. Necessary/desired information can be displayed on the latter at any desired location. Here, the intention is to implement non-contact energy and data transmission in order to keep the outlay for cabling/movable cabling as low as possible. With regard to a configurable cabin, the position of the labels (identifiers) on the display strip can be adapted simply to the seat layout. In addition, personalisation of the information can be performed. The components are to be integrated in the mechanical parts (housing, drawer). In the ideal case, the display is flush with the surface of the bin. In the closed state of the bin, data and the energy needed to change the display can be transmitted to the display unit. The data is transmitted from the CMS to the displays within the context of the necessary reconfiguration for the changed cabin layout.

Alternatively, the displays could also be supplied with energy via a portable RFID reader. To this end, it is necessary to go through the cabin with the reader; the displays are supplied with the information and the energy to change the image contents by radio. A corresponding procedure is, for example, that personnel go through the cabin with the RFID-based device and change the contents.

The invention is also based on the finding that ePapers are display elements which maintain their image content even without (the supply of) energy. These are known from practice, for example as price labels in the retail trade or else e-books. Simple displays are monochrome but there are also two-colour displays. Multicolour displays are at the development stage. The temperature of use for the operation generally lies between 0 and 40° C.

According to the invention, the result is a freely placeable display of seat rows or an electronic display of the seat row on the luggage compartment in the gangway area of an aircraft cabin.

According to the invention, by means of a display strip in the region of the hat rack/bin, it is possible to adapt the seat row display to the seating. The display of the seat row can be adapted flexibly to the seating. Furthermore, the display of additional information is possible.

BRIEF DESCRIPTION OF THE DRAWINGS

Further features, effects and advantages of the invention emerge from the following description of a preferred exemplary embodiment of the invention and the appended figures. In the latter, in a schematic basic sketch.

DETAILED DESCRIPTION OF THE DRAWINGS

Figure 1:
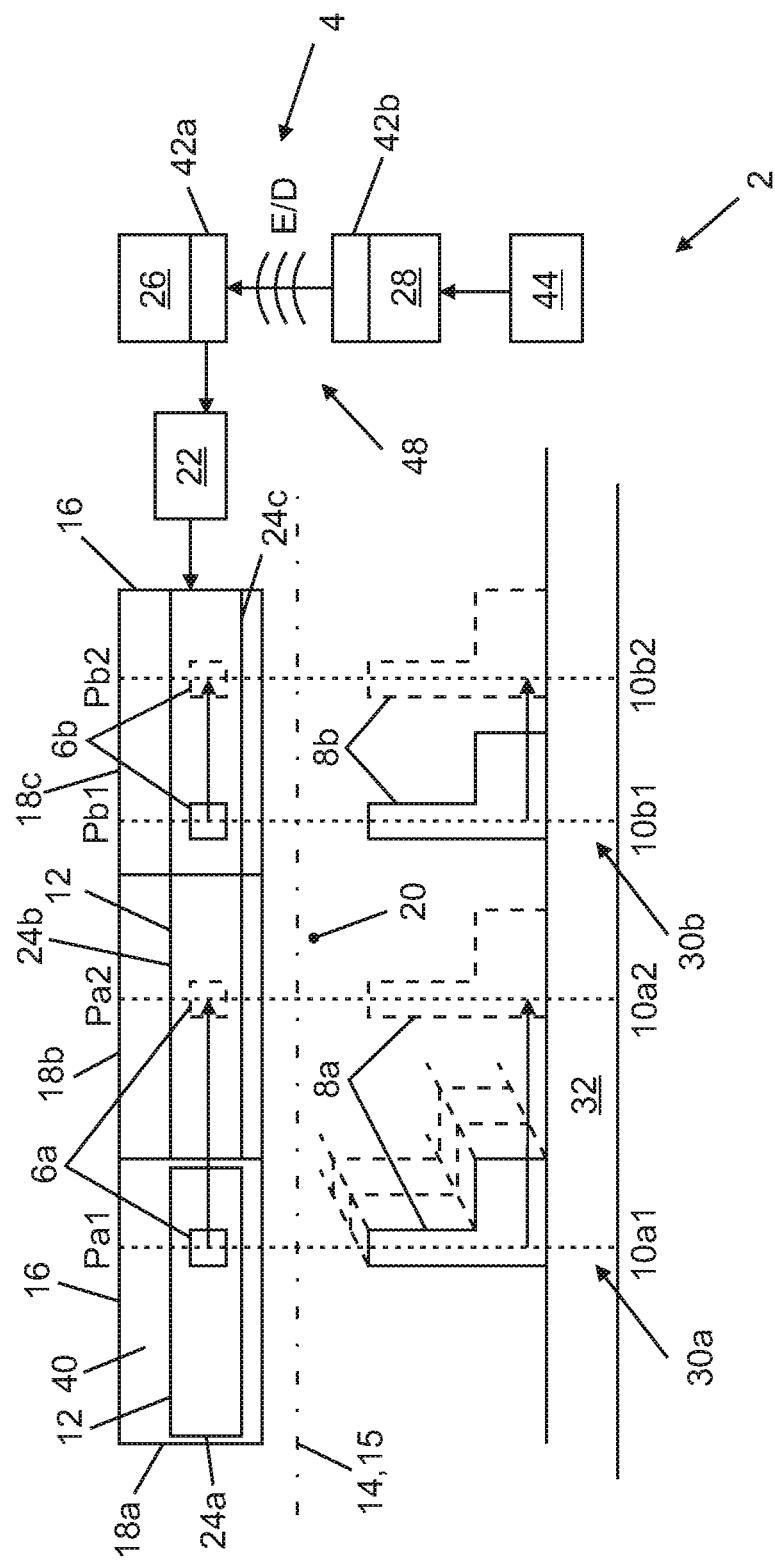
FIG. 1 shows an extract from a passenger cabin of an aircraft.

FIG. 1 shows an extract from a vehicle 2 in the form of an aircraft, specifically part of its passenger cabin. The vehicle 2 contains a display device 4. The vehicle 2 also contains seats 8a,b. The display device 4 is used to display, for example, two identifiers 6a,b for a respective seat 8a,b in the vehicle 2. A respective mounting location 10a,b of the seats 8a,b in the vehicle 2 is respectively variable. In the example, the seats 8a,b and their identifiers 6a,b are each illustrated by continuous lines for the first mounting location 10a1, 10b1 and dashed for the second mounting location 10a2, 10b2. The displacement of the seats 8a,b between the mounting locations 10a,b is indicated by arrows.

The display device 4 contains an electronic display 12, which extends along an extension direction 14. The extension direction 14 is the longitudinal direction 15 of the vehicle 2. The mounting locations 10a,b are thus also variable in the longitudinal direction of the vehicle 2. The vehicle 2 also contains a carrier 16. The carrier 16 is implemented here in the form of three luggage compartments 18a-c mounted above the seats 8a,b. The display 12 is attached to the carrier 16, which means it is located in the surroundings 20 of the seats 8a,b. In the extension direction 14, the display 12 extends along the possible mounting locations 10a1,2 and 10b1,2 of the seats 8a,b.

The display device 4 also contains a control device 22. The latter is used to display the identifiers 6a,b on the display 12 in respectively different longitudinal positions Pa1,2 for the identifier 6a and longitudinal positions Pb1,2 for the identifier 6b. Here, the respective longitudinal position Pa1,2, Pb1,2 is assigned to the respective mounting location 10a1,2 and 10b1,2. The assignment consists in that the respective longitudinal position of identifier 6 and associated mounting location 10 of the respective seat 8 is the same with respect to the extension direction 14.

In the example, the display 12 is subdivided into or assembled from a plurality of portions 24a-c extending along the extension direction 14, which are lined up in a row along the extension direction 14. The display 12 is an ePaper display.

The display 12 is implemented as a display strip. The identifiers 6a,b are (freely placeable) inscriptions, here in the form of the inscription "8a" for the seat 8a and "8b" for the seat 8*b*. These can be positioned and displayed along the extension direction 14 in any desired position of the display 12 (within the context of the possibilities of available pixels of the display 12 implemented as a digital display or the possibilities at display limits). The identifiers 6*a*,*b* can be displayed along the extension direction 14 in this sense in a continuously freely selectable respective longitudinal position P of the display 12.

The display 12 or its portions 24*a-c* are implemented continuously without interruption for a respective luggage compartment 18*a-c*, that is to say they have no interruption along the extension direction 14 along the luggage compartment 18*a-c*, so that the identifiers 6*a*,*b* can be placed optionally along the luggage compartments 18*a-c*. For the luggage compartment 18*a*, a first variant is illustrated, in which the portion 24*a* is respectively spaced apart from the edge of the luggage compartment 18*a* at the end in the extension direction 14. Thus, a small gap in the display 12 is produced. The luggage compartments 18*b,c* show an embodiment in which the portions 24*b,c* of the display butt up against each other without any gaps and thus form a display 12 which is gap-free overall there.

The display device 4 additionally contains a transmission module 26 for the non-contact transmission of energy E and/or data D between a remote station 28 of the vehicle 2 and the display device 4. In the figure, the lack of contact is symbolised by radio waves. In the example, energy and data are firstly transmitted from the transmission module 26 to the control device 22, the latter in turn supplying the display 12 with energy in order to change its display with regard to the identifiers 6*a*,*b*. Here, the data D is used for the selection, placement, configuration and so on of the identifiers 6*a*,*b* and to this extent likewise passed on to the display 12.

In the example according to FIG. 1, the remote station 28 is an RFID device or reader, which transmits the energy E and the data D to the transmission module 26 and therefore the display device 4.

In an alternative embodiment, indicated dashed, each of the seats 8*a,b* is part of a respective row of seats 30*a,b* (in FIG. 1, indicated only for the row of seats 30*a*). Each of the rows of seats 30*a,b* in turn contains further individual seats beside the seats 8*a,b*, which are not designated further here. The identifiers 6*a,b* in this case are the designations of the respective seat rows "30*a*" and "30*b*". In this embodiment, the identifiers 30*a,b* each additionally contain (not illustrated) the respective seat numbers and names of passengers for whom the seat is currently reserved.

The carrier 16 is a structural part of the vehicle 2, which is located in the region of a gangway 32, merely indicated schematically in FIG. 1, beside the seats 8 and rows of seats 30. The luggage compartments 18*a-c* specifically project partly into the gangway 32 and/or are accessible from the latter. The carrier 16 is therefore visible from the gangway 32. Since the display 12 is mounted appropriately on the carrier 16, this is also visible from the gangway 32 and is located in the region of the gangway 32.

Figure 2:
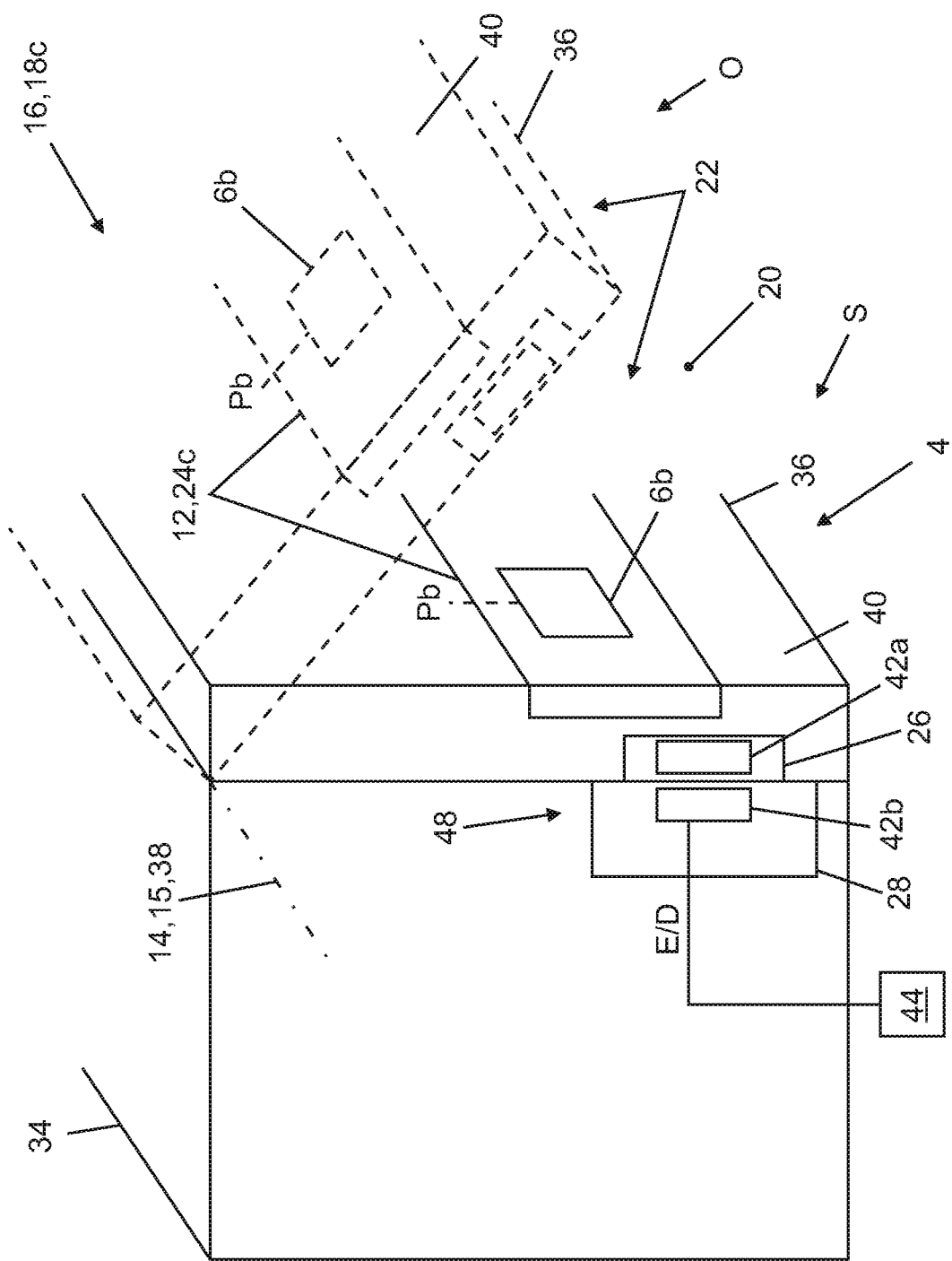
FIG. 2 shows the luggage compartment from FIG. 1 in detail and an oblique view.

FIG. 2 shows the luggage compartment 18*c* in a perspective detailed view (leaving out the remaining luggage compartments 18*a,b* and representative of these). The luggage compartments 18*a-c* each contain a base 34, which is permanently installed in the vehicle 2. The luggage compartment 18*a-c* also contains a cover part 36 that is movable relative to the base 34, which here can be pivoted relative to the base 34 about a pivot axis 38. The display 12 is attached to the cover part 36, the latter here ending flush with a surface 40 of the carrier 16 or luggage compartment 18*a-c*.

The transmission module 26 contains a first coupling part 42*a*, which is fixed to the cover part 36. The remote station 28 contains a second coupling part 42*b*, which is fixed to the base 34. In the closed state S, which is illustrated by a continuous line in FIG. 2, the coupling parts 42*a,b* are operatively coupled for the non-contact transmission, which means that the non-contact transmission indicated by radio waves in FIG. 1 takes place as required between the two coupling parts 42*a,b*.

In the open state O (illustrated dashed), the corresponding coupling is cancelled, so that a transmission of energy E and/or data D between the coupling parts 42*a,b* and therefore between remote station 28 and transmission module 26 no longer succeeds.

The entire display device 4 and therefore also the control device 22 is integrated (not illustrated) in the cover part 36. Each of the cover parts 36 of the luggage compartments 18*a-c* has its own control device 22, so that, in the sense of the display device 4, the former is implemented as a distributed structure of an overall control device 22.

Thus, neither for the data D transmission nor for the energy E supply of the display device 4 is any kind of cable-bound connection or galvanic contact or the like between base 34 and cover part 36 necessary.

The vehicle 2 additionally contains a central unit 44, here in the form of a cabin management system, which is used to place all the identifiers 6*a,b* on the display 12. The remote station 28 is therefore connected to the central unit 44 in a cable-bound manner.

Figure 3:
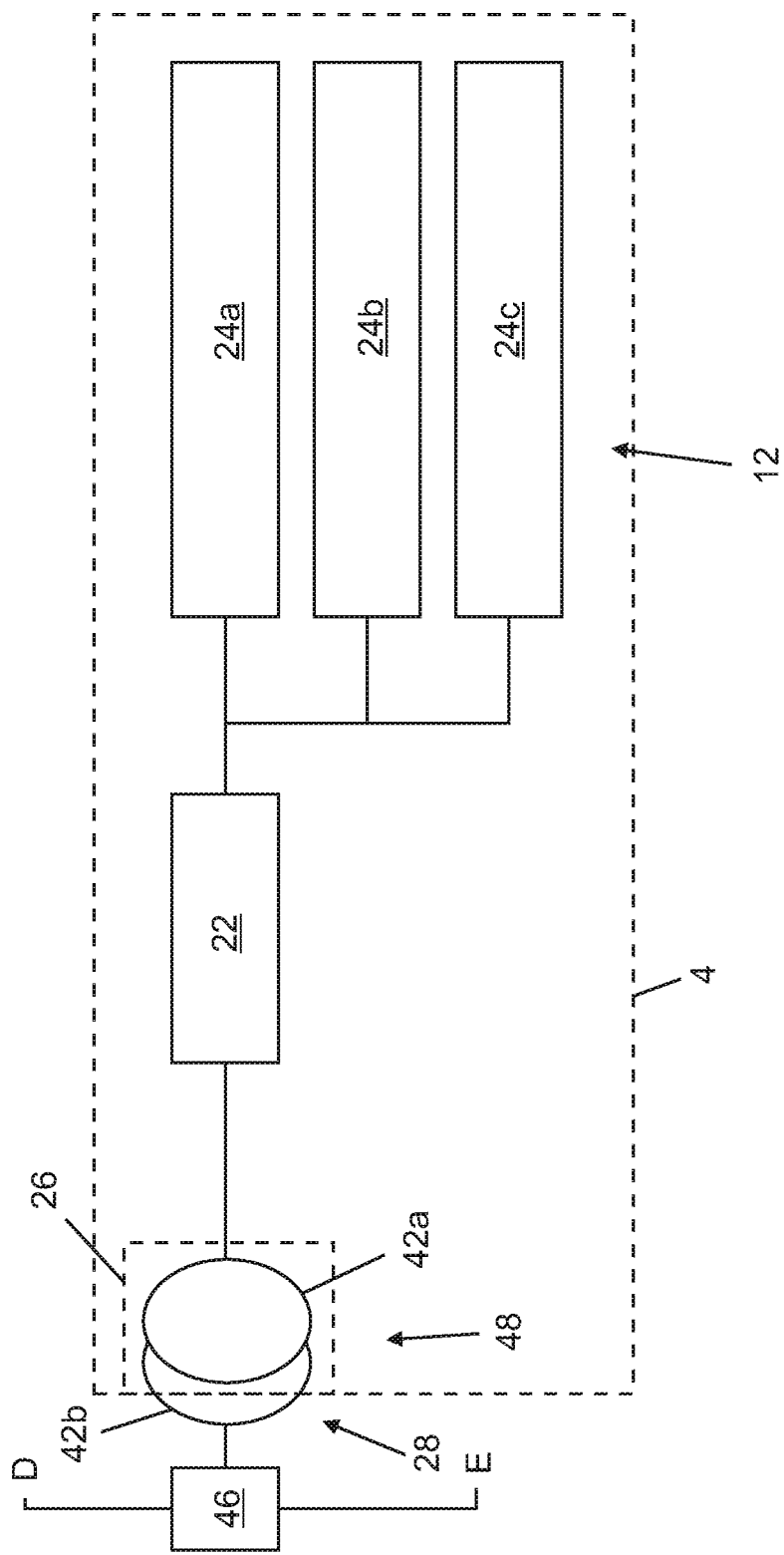
FIG. 3 shows a display device according to the invention in a schematic view.

FIG. 3 shows once more a schematic illustration of a display device 4. Here, this comprises the components display 12, display activation in the form of the control device 22, and transmitter 48 for data D and energy E in the form of the coupling parts 42*a,b*. Data D and energy E are combined via a modulator 46 and led to a transmitter 48. The non-contact transmission of the energy E and data D takes place within the transmitter 48. From the transmitter 48, the energy E and data D reach the control device 22, also called "activation means". The activation means is in particular a microcontroller. The latter drives the display 12, here in the form of the three portions 24*a-c*.

For the modulator 46, there are already finished solutions in the energy transmission area, for example based on the QI standard.

For the transmitter 48, because of the growing market for non-contact charging of small devices (for example mobile telephone), many solutions for the transmitter coil are available on the market, also including appropriate shielding means.

The control device 22 can be implemented in particular in the form of a microcontroller which, in particular, has an SPI interface.

A display device 4 can thus also be implemented with COTS components. The energy E supply takes place in particular via a pair of coils (coupling parts 42*a,b*).

Alternatively, a portion 24*a-c* can again also be built up from individual partial displays, which in particular butt up against one another without gaps. Under certain circumstances, here a small space between the partial displays is produced, which is necessitated by the design of the partial displays. This is generally tolerable for a display 12 produced overall.

LIST OF REFERENCE SYMBOLS

2 Vehicle
4 Display device 6a,b Identifier
8a,b Seat
10a,b Mounting location
12 Display
14 Extension direction
15 Longitudinal direction
16 Carrier
18a-c Luggage compartment
20 Surroundings
22 Control device
24a-c Portion
26 Transmission module
28 Remote station
30a,b Row of seats
32 Gangway
34 Base
36 Cover part
38 Pivot axis
40 Surface
42a,b First, second coupling part
44 Central unit
46 Modulator
48 Transmitter
Pa,b Longitudinal position
E Energy
D Data
S Closed state
O Open state

What is claimed is:

1. A display device for displaying at least one identifier for a seat in a vehicle, a mounting location of the seat in the vehicle being variable, wherein
the display device contains an electronic display in the form of a display strip, which extends along an extension direction and can be attached to a carrier of the vehicle in the surroundings of the seat, in order to extend in the extension direction along possible mounting locations,
the display device contains a control device for displaying the identifier on the display optionally in at least two different longitudinal positions along the extension direction, wherein the identifier can be displaced within the display without having to change the display physically, wherein the respective longitudinal position is assigned to the respective mounting location,
wherein the display contains a plurality of portions extending along the extension direction and separated from one another, which are individual displays which, taken together, combine to form the display and which can be lined up in a row along the extension direction, wherein the display is an ePaper display.

2. The display device according to claim 1, wherein the identifier can be displayed along the extension direction in a continuously freely selectable longitudinal position of the display.

3. The display device according to claim 1, wherein the display device contains a transmission module for the non-contact transmission of energy and/or data between a remote station and the display device.

4. A vehicle, having at least one seat, a mounting location of the seat in the vehicle being variable, and having a carrier, wherein the vehicle contains a display device according to claim 1, wherein the display is attached to the carrier of the vehicle in the surroundings of the seat and extends in the extension direction along possible mounting locations of the seat.

5. The vehicle according to claim 4, wherein the mounting location is variable along a longitudinal direction of the vehicle and the extension direction is the longitudinal direction of the vehicle.

6. The vehicle according to claim 4, wherein the seat is part of a row of seats.

7. The vehicle according to claim 4, wherein the carrier is a structural part of the vehicle, which is located in the area of a gangway located beside the seat and/or is visible from the gangway.

8. The vehicle according to claim 4, wherein the carrier contains a luggage compartment of the vehicle, which is mounted above the seat.

9. The vehicle according to claim 8, wherein the display for a respective luggage compartment is implemented so as to be continuous and interruption-free.

10. The vehicle according to claim 8, wherein the vehicle contains the remote station and the luggage compartment has a base permanently installed in the vehicle and a cover part that can be moved relative to the base, wherein the display is attached to the cover part, wherein the transmission module has a first coupling part on the cover part, and the remote station has a second coupling part on the base.

11. The vehicle according to claim 4, wherein the vehicle is a bus or a train or a boat or an aircraft.

12. The vehicle according to claim 4, wherein the vehicle contains a central unit for placing all the identifiers on the display.

13. The vehicle according to claim 4, wherein the display ends flush with a surface of the carrier.

* * * * *